US012559398B2

(12) United States Patent　　　　(10) Patent No.:　US 12,559,398 B2
Davis　　　　　　　　　　　　　　　　　(45) Date of Patent:　　Feb. 24, 2026

(54) SYSTEMS AND METHODS OF REMOVING TOXIC SUBSTANCES FROM WATER USING VERMIFILTRATION

(71) Applicant: PERCA, INC., Walla Walla, WA (US)

(72) Inventor: Russell V. Davis, Walla Walla, WA (US)

(73) Assignee: Perca, Inc., Walla Walla, WA (US)

( * ) Notice: Subject to any disclaimer, the term of this patent is extended or adjusted under 35 U.S.C. 154(b) by 0 days.

(21) Appl. No.: 19/016,858

(22) Filed: Jan. 10, 2025

(65) Prior Publication Data

US 2025/0236547 A1　　Jul. 24, 2025

Related U.S. Application Data

(60) Provisional application No. 63/619,577, filed on Jan. 10, 2024.

(51) Int. Cl.
　　　*C02F 3/32*　　　　　(2023.01)
　　　*C02F 1/00*　　　　　(2023.01)
　　　　　　(Continued)
(52) U.S. Cl.
　　　CPC ............. *C02F 3/327* (2013.01); *C02F 1/006* (2013.01); *C02F 1/66* (2013.01);
　　　　　　(Continued)
(58) Field of Classification Search
　　　None
　　　See application file for complete search history.

(56)　　　　　　References Cited

U.S. PATENT DOCUMENTS 5,020,730 A　*　6/1991　Perroud ............... A01G 25/095
　　　　　　　　　　　　　　　　　　　　　239/63
10,112,858 B2　10/2018　Nickerson et al.
　　　　　　　　　(Continued)

FOREIGN PATENT DOCUMENTS

FR　　　　2921651 A1　　4/2009

OTHER PUBLICATIONS

Orbit, how to use our landscape irrigation planning designer (Year: 2021).*
　　　　　　　　　　　(Continued)

*Primary Examiner* — Peter Keyworth
(74) *Attorney, Agent, or Firm* — Sterne, Kessler, Goldstein & Fox P.L.L.C.

(57)　　　　　　ABSTRACT

Embodiments described herein are directed to methods and systems for treating wastewater or storm water using vermifiltration. The wastewater can come from various sources, such as agricultural sources, municipal and industrial sources, wineries, the dairy industry, and many others. The systems can include vermicomposting beds that are capable of removing high amounts of contaminants, pollutants, and/or toxic substances from wastewater. The wastewater may be applied to vermicomposting beds, for example, by an irrigation system. The irrigation system may provide, for example, improved bed coverage and more even saturation. The vermicomposting beds can remove various harmful substances from the wastewater, such as petroleum products; industrial chemicals; heavy metals (e.g., lead, mercury, cadmium, arsenic); pesticides (e.g., atrazine, chlorpyrifos); and organic compounds (e.g., phenols, polycyclic aromatic hydrocarbons ("PAHs"), polychlorinated biphenyls ("PCBs")).

30 Claims, 4 Drawing Sheets

(51) Int. Cl.

| | |
|---|---|
| *C02F 1/66* | (2023.01) |
| *C02F 101/20* | (2006.01) |
| *C02F 101/30* | (2006.01) |
| *C02F 101/32* | (2006.01) |
| *C02F 101/34* | (2006.01) |
| *C02F 101/36* | (2006.01) |

(52) U.S. Cl.
CPC .... *C02F 2001/007* (2013.01); *C02F 2101/20* (2013.01); *C02F 2101/306* (2013.01); *C02F 2101/327* (2013.01); *C02F 2101/345* (2013.01); *C02F 2101/363* (2013.01); *C02F 2203/002* (2013.01); *C02F 2209/06* (2013.01); *C02F 2209/44* (2013.01); *C02F 2301/046* (2013.01); *C02F 2303/26* (2013.01)

(56) References Cited

U.S. PATENT DOCUMENTS

| | | | |
|---|---|---|---|
| 11,059,733 B2 | 7/2021 | Tirman | |
| 2005/0133442 A1 | 6/2005 | Koehler | |
| 2005/0184011 A1* | 8/2005 | Fields | C02F 9/00 |
| | | | 210/748.12 |
| 2014/0116948 A1* | 5/2014 | Meyer | E21B 43/2607 |
| | | | 166/308.1 |

OTHER PUBLICATIONS

International Search Report and Written Opinion for Application No. PCT/US2025/011120, mailed on Mar. 13, 2025, 14 pages.

\* cited by examiner

1000

Pretreat wastewater ~1010

Adjust pH of wastewater ~1020

Apply wastewater to vermicomposting system ~1030

Treat the wastewater ~1040

Collect/store wastewater ~1050

Discharge or useful products ~1060

SYSTEMS AND METHODS OF REMOVING TOXIC SUBSTANCES FROM WATER USING VERMIFILTRATION

CROSS-REFERENCE

This application claims the benefit of U.S. Provisional Application No. 63/619,577, filed Jan. 10, 2024, which is incorporated herein in its entirety by reference thereto.

BACKGROUND

The present disclosure relates to systems and methods for treating water containing toxic substances and/or other contaminants. More specifically, the present disclosure relates to systems and methods for the collection, handling, treatment, removal, and/or disposal of toxic substances and contaminants found in water (e.g., wastewater and storm water) using vermifiltration.

BRIEF SUMMARY

Some embodiments are directed to a system for treating wastewater that includes a wastewater collection tank configured to receive wastewater; a wastewater pretreatment tank configured to reduce an average particle size of solids in the wastewater; an equalization system configured to adjust the pH of the wastewater; a vermifiltration system comprising a vermifiltration bed; an irrigation system configured to distribute wastewater to the vermifiltration bed; and a treated wastewater collection tank. In some embodiments, the wastewater includes at least one of dairy wastewater, agricultural wastewater, municipal wastewater, industrial wastewater, or winery wastewater.

In any of the various embodiments disclosed herein, the system includes a treated wastewater discharge system.

In any of the various embodiments disclosed herein, the wastewater pretreatment tank is a settling tank configured to remove unsettled solids in the wastewater.

In any of the various embodiments disclosed herein, the wastewater pretreatment tank includes a maceration tank configured to dissolve solids in the wastewater.

In any of the various embodiments disclosed herein, the equalization system includes a buffering tank.

In any of the various embodiments disclosed herein, the equalization system includes a pH adjustment tank.

In any of the various embodiments disclosed herein, the equalization system is configured to adjust the pH of the wastewater to a target pH. In some embodiments, the target pH is from about 5 to about 9. In some embodiments, the target pH is from about 6 to about 8. In some embodiments, the target pH is about 7.

In any of the various embodiments disclosed herein, the vermifiltration bed includes earthworms. In some embodiments, the vermifiltration bed includes a non-wood substrate.

In any of the various embodiments disclosed herein, the irrigation system includes a plurality of sprinklers, and the plurality of sprinklers includes a first sprinkler disposed at a first corner of the vermifiltration bed. In any of the various embodiments disclosed herein, the plurality of sprinklers includes a second sprinkler disposed along a side wall of the vermifiltration bed.

In any of the various embodiments disclosed herein, the irrigation system comprises a wind speed meter that is configured to turn off the plurality of sprinklers in response to the wind speed meter detecting that the wind speed is greater than or equal to a predetermined speed.

In any of the various embodiments disclosed herein, the irrigation system is configured to distribute wastewater to at least about 90% of a surface of the vermifiltration bed.

Some embodiments are directed to a method of treating wastewater that includes receiving wastewater; pretreating wastewater in a pretreatment system; vermifiltration of the pretreated wastewater in a vermifiltration system to produce a treated wastewater; and irrigating the vermifiltration bed with pretreated wastewater. In some embodiments, the pretreating the wastewater includes reducing an average particle size of solids in the wastewater. In some embodiments, the vermifiltration includes flowing the pretreated wastewater through a vermifiltration bed. In some embodiments, the irrigating includes alternately flowing the pretreated wastewater and not flowing the pretreated wastewater. In some embodiments, the treated wastewater contains fewer toxic substances than the wastewater.

In any of the various embodiments disclosed herein, the pretreating further includes settling the wastewater in a settling tank to separate solids from the wastewater.

In any of the various embodiments disclosed herein the irrigating comprises flowing the wastewater for about 1 minute to about 5 minutes and not flowing the pretreated wastewater for about 30 minutes to about 60 minutes.

In any of the various embodiments disclosed herein, the pretreating includes reducing the average particle size of solids in the wastewater to less than or equal to about 0.125 inches.

In any of the various embodiments disclosed herein, the vermifiltration bed includes earthworms.

In any of the various embodiments disclosed herein, the method further includes adjusting the pH of the pretreated wastewater. In some embodiments, the pH is adjusted to about 7.

In any of the various embodiments disclosed herein, the method includes recirculating treated wastewater through to the vermifiltration system.

In any of the various embodiments disclosed herein, the vermifiltration bed includes a non-wood substrate.

DETAILED DESCRIPTION

Figure 1A:
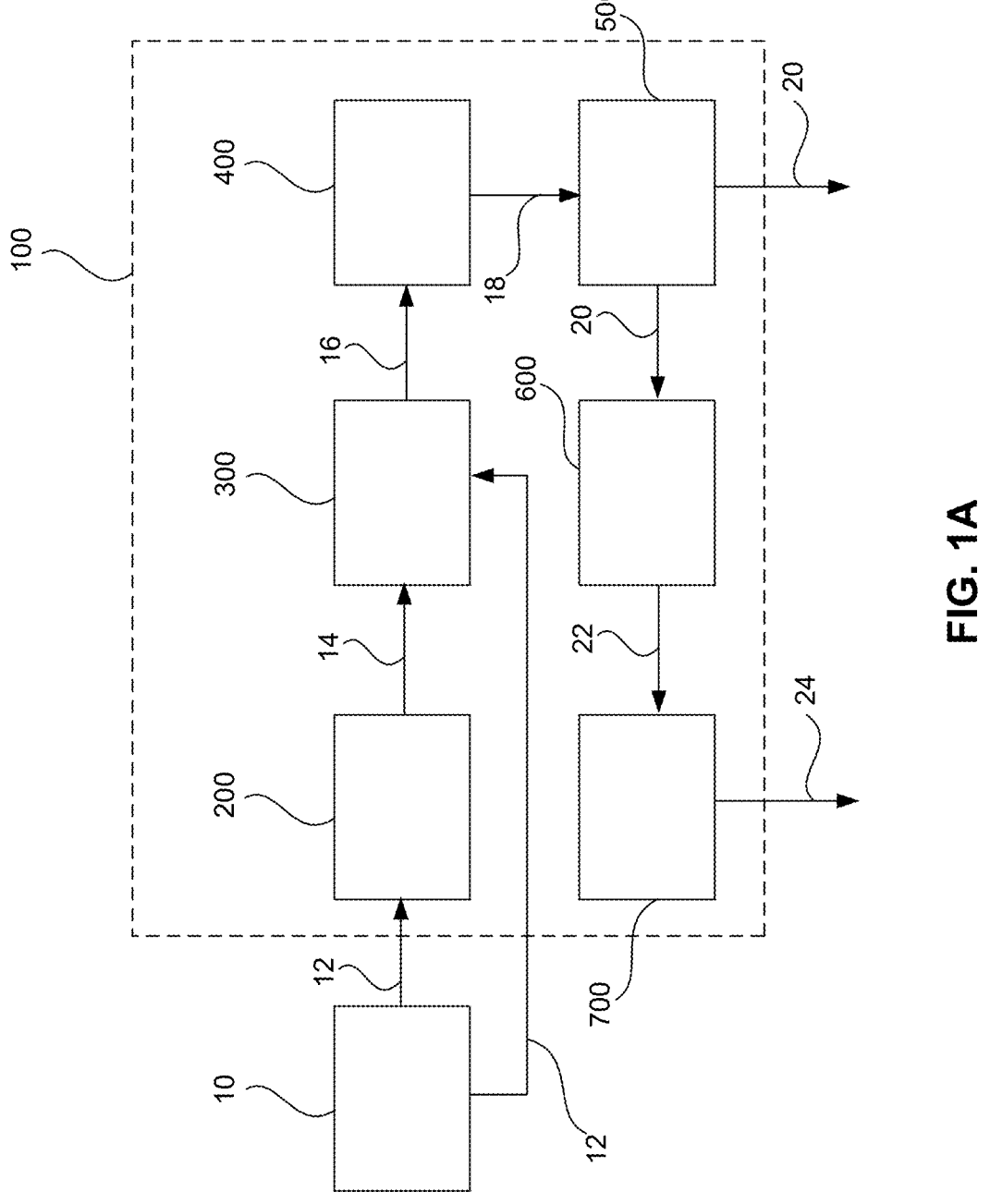
FIG. 1A shows a system of treating wastewater according to some embodiments.

The discharge of toxic chemicals into wastewater and stormwater is a serious environmental problem, with detrimental effects on human health and aquatic life. Contaminated water is a significant problem in nearly all parts of the world. Contaminated water can be, for example, wastewater and/or storm water drainage or runoff. Wastewater can come from various sources, such as the municipal and industrial sources, food processing industry, the dairy industry, agricultural sources, wineries, and many others. Storm water can come from various runoff sources, such as parking lots, airports, roadways, industrial industries, agriculture industries, and many others. Water from these sources typically contains high biological (or biochemical) oxygen demand ("BOD"), high total suspended solids ("TSS"), excessively high or excessively low pH, toxic chemicals including N-(1,3-dimethylbutyl)-N'-phenyl-p-phenylenediamine ("6PPD"), polychlorinated biphenyls ("PCBs"), perfluoro-alkyl and polyfluoroalkyl substances ("PFAS"), perfluorooctane sulfonate ("PFOS"), polycyclic aromatic hydrocarbons ("PAHs"), and other potential challenging constituents, such as heavy metals and arsenic. Additionally, pesticides, such as atrazine and chlorpyrifos, are commonly used in agriculture and can leach into the groundwater and surface water, leading to contamination. Various other toxic chemicals can be found in wastewater, including antidegradants (e.g., 6PPD-quinone), and commercial de-icers. Commercial de-icers, often used for deicing aircraft, include harmful chemicals that can cause various environmental issues, including increased salinity of groundwater and toxicity to humans and animals.

Existing wastewater treatment methods are often limited in their ability to remove toxic substances from wastewater and are cost prohibitive. Often these existing methods are not environmentally friendly. For example, existing methods may include physical and chemical treatments, but they are often unable to remove common toxic chemicals safely and completely, without the use of caustic acids and bases, such as sulfuric acid and sodium hydroxide.

Vermitreatment of wastewater or storm water is a practical solution to remove problematic contaminants that involves flowing wastewater or storm water through, for example, a vermifiltration system. Specific earthworm species are uniquely engineered to tolerate relatively high concentrations of persistent contaminants in storm water and wastewater and render them inert. Embodiments described herein overcome the challenges of treating contaminated water through vermifiltration water, such a lowering overall costs, better components, improved coverage of filtration space during irrigation, integration with ancillary biological treatment, automation that accounts for weather related concerns, lower risk pH adjustment, minimized drift and better effluent containment, and lowered vector impacts, such as less bird intervention.

Systems disclosed herein can be used to improve water quality, including reducing turbidity, reducing or removing colloidal solids, improving water color, etc. In some embodiments, vermitreatment disclosed herein can reduce turbidity of wastewater. In some embodiments, vermitreatment disclosed herein can reduce or remove colloidal solids from water. In some embodiments, vermitreatment disclosed herein can improve water color, for example, by removing colloidal and/or dissolved solids.

Systems disclosed herein can remove pathogen and biological contaminants. In some embodiments, vermitreatment disclosed herein can remove pathogens and contaminants such as fecal coliform and *Salmonella*.

FIG. 1A illustrates a vermifiltration system (e.g., system 100) according to some embodiments. For example, as described in more detail below, wastewater 12 from wastewater source 10 can flow into system 100. In some embodiments, wastewater 12 can flow into collection system 200. In some embodiments, wastewater 12 can flow directly to pretreatment system 300. In some embodiments, after pretreatment, pretreated wastewater 16 can flow to equalization system 400 (e.g., for pH adjustment). In some embodiments, pH adjusted wastewater 18 can flow to vermifiltration system 500 (e.g., by applying pH adjusted wastewater 18 to beds 510 as discussed below) where various contaminants and toxic substances are removed and/or broken down. In some embodiments, the effluent 20 from vermifiltration system 500 can flow to collection system 600. In some embodiments, effluent 20 from vermifiltration system 500 can be discharged directly from vermifiltration system 500 (e.g., drained to the environment). In some embodiments, collected effluent 22 can be routed to discharge system 700, which can discharge the collected effluent to a municipal system, irrigation system, etc.

Figure 1B:
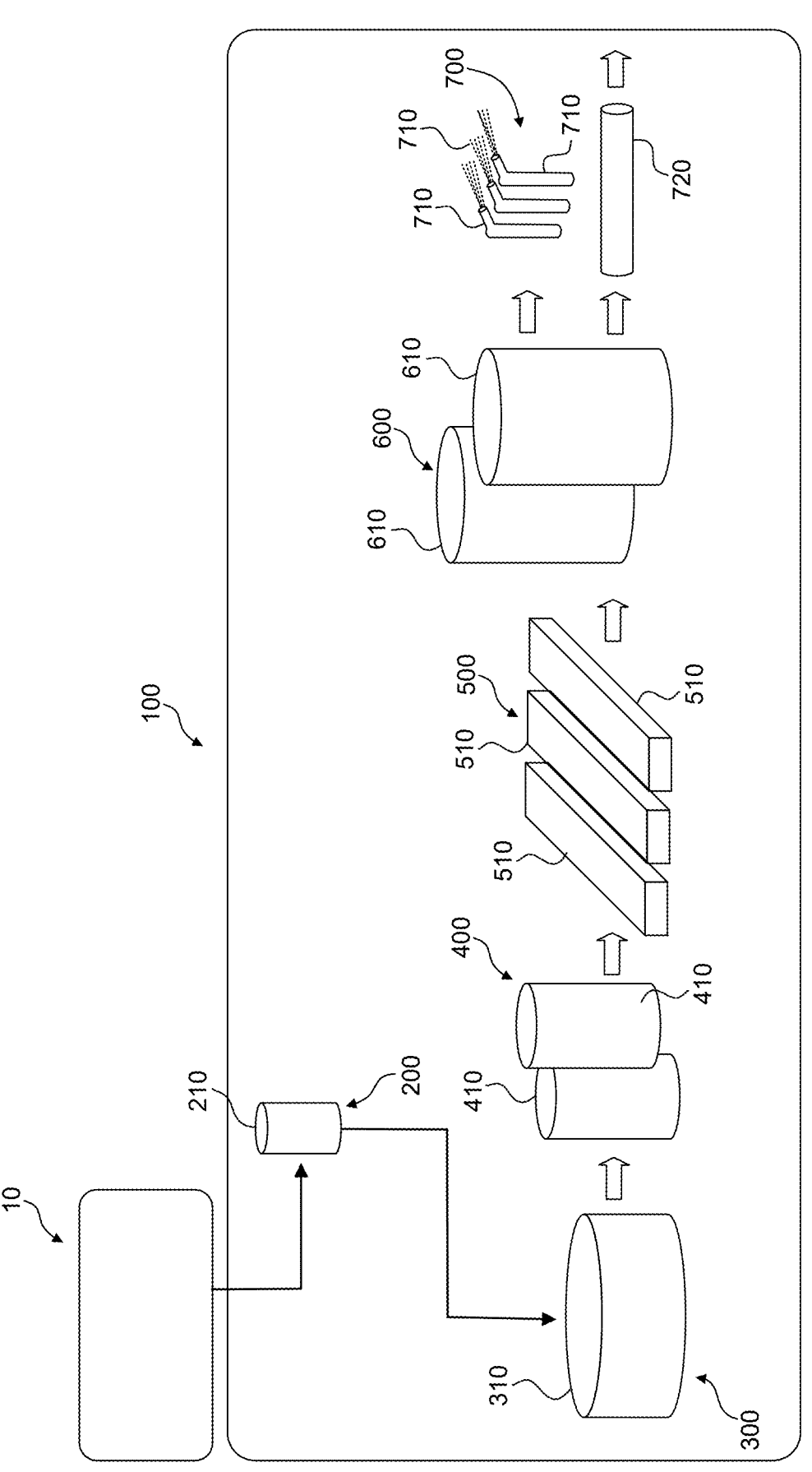
FIG. 1B shows a system of treating wastewater according to some embodiments.

FIG. 1B illustrates a vermifiltration system (e.g., system 100) according to some embodiments. System 100 may receive wastewater from source 10. System 100 may receive storm water from source 10. In some embodiments, system 100 receives untreated wastewater (i.e., raw wastewater) directly from source 10. System 100 may include collection system 200, wastewater pretreatment system 300, equalization system 400, vermifiltration beds 500, storage system 600, and discharge system 700.

In some embodiments, wastewater is generated at source 10. Wastewater may be liquid or a mixture of liquids and solids. Wastewater sources may include municipal and industrial sources, airports, roadways, wineries, independent water districts, breweries, the dairy industry, agricultural sources, and many others. The wastewater from the various sources can be high in different types of toxic substances and contaminants.

In some embodiments, storm water is accumulated at source 10, for example, after heavy precipitation. Storm water may be a liquid or mixture of liquids and solids. Storm water sources may include runoff from parking lots, airports, and roadways or from many industries after heavy precipitation, such as municipal and industrial sources, wineries, breweries, the dairy industry, agricultural sources, and many others.

As used herein, municipal wastewater can include wastewater from homes, offices, stores, schools, prisons and businesses. Municipal wastewater may contain high levels of BOD, toxic and persistent chemicals, and pharmaceutical residues. Municipal wastewater may include many of the same chemicals as municipal storm water. As used herein, industrial wastewater can include wastewater from industrial facilities, such as factories, manufacturing facilities, food and drink processors, and energy plants. Winery wastewater can include wastewater from wineries. Winery wastewater may contain high levels of BOD, TSS, and/or PFAS. Wastewater may have a high biological oxygen demand ("BOD"), high total suspended solids ("TSS"), excessively high pH (e.g., pH greater than 9), and excessively low pH (e.g., pH less than 5. As used herein, dairy wastewater can include wastewater from dairy operations (e.g., dairy farms). Dairy wastewater may contain high levels of nitrogen, suspended solids, biochemical oxygen demand (BOD), and chemicals. As used herein, agricultural wastewater can include wastewater from crop production, livestock production, fisheries, and forestry. Agricultural wastewater may contain high levels of chemicals, BOD, TSS, and/or PFAS. Wastewater may contain various toxic substances or contaminants, such as polychlorinated biphenyls ("PCBs"), perfluoroalkyl and polyfluoroalkyl substances ("PFAS"), perfluorooctane sulfonate ("PFOS"), polycyclic aromatic hydrocarbons ("PAHs"), heavy metals, and arsenic. Often wastewater, especially from agricultural sources, may contain pesticides, such as atrazine and chlorpyrifos. In some embodiments, wastewater and/or storm water may contain high levels of persistent organic pollutants.

In some embodiments, system 100 includes collection system 200 that may receive wastewater from source 10. In some embodiments, the wastewater is collected in collection system 200. In some embodiments, collection system 200 includes at least one collection tank 210. In some embodiments, system 100 does not include a collection system 200 and wastewater from source 10 is flowed directly to pretreatment system 300.

In some embodiments, system 100 includes pretreatment system 300 for pretreating the wastewater. In some embodiments, the pretreatment system 300 comprises one or more tanks 310. In some embodiments, the pretreatment system 300 includes 1 or more (e.g. 2 or more, 3 or more, or 4 or more) tank(s) 310. The number of tanks 310 may be adjusted based on various factors, such as volume of wastewater to be treated, concentration of contaminants and constituents, and the pH of wastewater. In some embodiments, pretreatment system 300 includes a first tank 310 for a settling process and a second tank 310 for reducing particle size of the wastewater (e.g., by maceration).

In some embodiments, a settling process takes place in tank 310, which can be a settling tank. In some embodiments, the settling process is used to separate solids from liquid, for example by allowing unsettled solids in the wastewater to settle to the bottom of tank 310.

In some embodiments, tank 310 is used to reduce the average particle size of the wastewater. Wastewater often has particle sizes that make it unsuitable for flowing through pipes. For example, wastewater may have particles having a size of one mm or more. In some embodiments, the average particle size of the wastewater is reduced about a third of its original size or less. In some embodiments, the average particle size of the wastewater is reduced to less than or equal to about 0.25 inches (e.g., less than or equal to about 0.125 inches or less than 0.05 inches). In some embodiments, tank 310 is a maceration tank. In some embodiments, the maceration tank reduces particle size by maceration. In some embodiments, maceration means reduction of particle sizes. In some embodiments, larger particles are dissolved in the wastewater.

In some embodiments, the wastewater is pretreated in tank 310 until solids in the wastewater are small enough for worms to digest. In some embodiments, the wastewater is pretreated in tank 310 until solids in the wastewater are small enough to ensure the wastewater flows through the irrigation system. In some embodiments, the pretreatment system 300 operates under aerobic conditions.

In some embodiments, equalization system 400 receives wastewater. In some embodiments, equalization system 400 receives pretreated wastewater from pretreatment system 300. In some embodiments, the equalization system comprises one or more tanks 410.

Wastewater and/or pretreated wastewater may be transferred to equalization system 400 in various ways. For example, in some embodiments, system 100 includes a pump for pumping wastewater and/or pretreated wastewater into tanks 410. In some embodiments, wastewater and/or pretreated wastewater is pumped into tanks 410 from a lift station. In some embodiments, a lift station is a pump configured to move liquid from a lower position to a higher position. In some embodiments, wastewater and/or pretreated wastewater is gravity fed to tanks 410.

In some embodiments, the pH of the wastewater and/or pretreated wastewater can be adjusted in tanks 410. In some embodiments, tanks 410 may be pH adjustment tanks. In some embodiments, the pH of the wastewater and/or pretreated wastewater is adjusted to a pH in a range from about 5 to about 9, or about 5.5 to 8.5, or about 6 to 8, or about 6.5 to 7.5, or within a range having any two of these values as endpoints. In some embodiments, the pH is adjusted to a pH in a range of from about 5 to about 9. In some embodiments, the pH is adjusted to about 7. In some embodiments, unlike many existing processes, pH can be adjusted using non-toxic substances. In some embodiments, the pH is adjusted by adding acids and/or bases. In some embodiments, the pH is adjusted by adding organic acids, such as citric acid, tartaric acid, oxalic acid, and acetic acid, to the wastewater in the pH adjustment tanks 410. In some embodiments, the pH is adjusted by adding organic alkaline liquids, such as magnesium hydroxide (commonly known as milk of magnesia).

In some embodiments, the tanks 410 are buffering tanks. In some embodiments, buffering tanks adjust the pH of the wastewater. In some embodiments, buffering tanks provide hydraulic buffering to wastewater and/or pretreated wastewater. In some embodiments, buffering tanks provide hydraulic buffering to wastewater by adjusting the water flow and the dosing load of the wastewater and/or pretreated wastewater. The dosing load is a metric for the rate at which water can be treated. The dosing load may be variable and can be determined based on various factors, including environmental factors, level of contaminants in the wastewater, amount of water to be treated, and desired level of contaminants in the effluent of beds 510. In some embodiments, buffering tanks provide pollutant load buffering to wastewater and/or pretreated wastewater. In some embodiments, buffering tanks allow for pollutant load buffering to wastewater and/or pretreated wastewater by ensuring the pollutant is able to be processed by the worms by preventing over application of the wastewater to beds 510.

In some embodiments, the wastewater and/or pH-adjusted wastewater is transferred to vermifiltration system 500. In some embodiments, the wastewater is distributed to one or more vermifiltration beds 510. In some embodiments, the vermifiltration beds 510 are open to the atmosphere. For example, vermifiltration beds 510 may have an open top. In some embodiments, vermifiltration beds 510 are portable beds that can be moved from one site to another site. In some embodiments, vermifiltration beds 510 are fixed beds that remain at one site.

Figure 3:
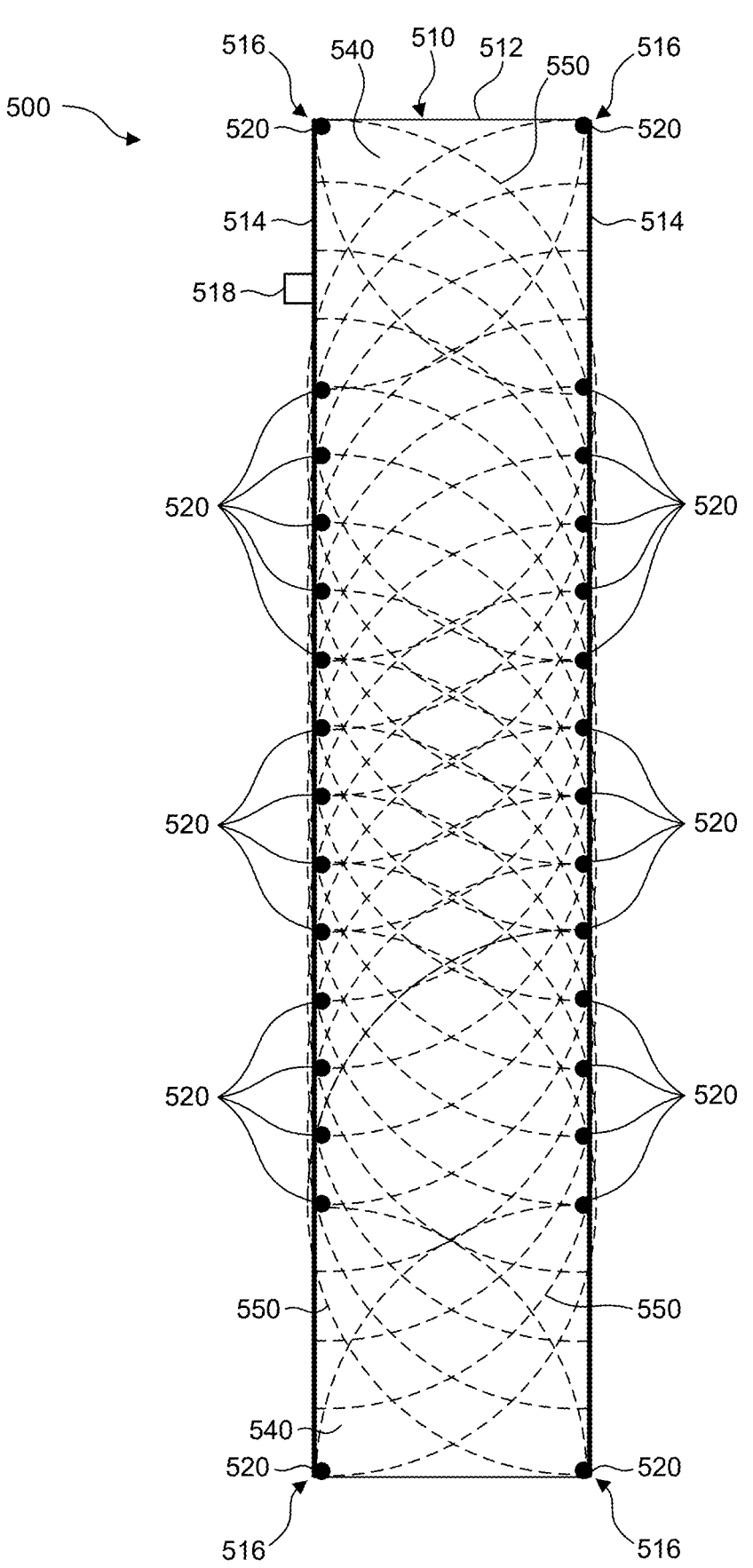
FIG. 3 shows a vermifiltration bed and irrigation system according to some embodiments.

FIG. 3 illustrates bed 510 according to some embodiments. As shown in FIG. 3, bed 510 may have a rectangular shape defined by end walls 512 and side walls 514. In some embodiments, bed 510 has a width along end walls 512 of from about 20 feet to about 50 feet, from about 30 feet to about 40 feet, or within a range having any two of these values as endpoints. In some embodiments, bed 510 has a width along end walls 512 of about 40 feet. In some embodiments, bed 510 has a length along side walls 514 of from about 50 feet to about 500 feet, from about 100 feet to about 400 feet, from about 200 feet to about 300 feet, or within a range having any two of these values as endpoints. In some embodiments, bed 510 has a length of about 200 feet. In some embodiments, bed 510 has a width of about 40 feet and a length of about 200 feet. In some embodiments, bed 510 may have a depth of at least 3 feet. In some embodiments, bed 510 has a depth of about 3 feet to about 4 feet.

The wastewater (e.g., raw wastewater, treated wastewater, and/or pH-adjusted wastewater) can be applied to the beds in various ways. For example, in some embodiments, the wastewater is sprayed onto beds 510 (e.g., through an irrigation system).

In some embodiments, the amount of wastewater applied to the vermifiltration beds 510 is based on the number of worms in the vermifiltration beds 510. In some embodiments, the amount of wastewater applied to the vermifiltration beds 510 can vary, for example, based on the species of worms in the vermifiltration beds 510. In some embodiments, the amount of wastewater applied to the vermifiltration beds 510 is based on the size of the vermifiltration beds 510.

In some embodiments, each bed 510 is filled with organic matter. In some embodiments, the organic matter is about 3 feet deep. In some embodiments, the organic matter comprises a layer that is a mixture of the organic matter and earthworms. In some embodiments, each bed 510 comprises a layer between about 5 cm and about 20 cm of organic matter and earthworms. In some embodiments, the layer is between about 10 and about 20 cm of organic matter and earthworms. In some embodiments, each bed 510 comprises worms. In some embodiments, each bed 510 comprises between about 100 and about 500 worms per cubic foot of organic matter. In some embodiments, each bed 510 comprises between about 200 and about 400 worms per cubic foot of organic matter. In some embodiments, the organic matter comprises soil, wood, plants, or combinations thereof. In some embodiments, the organic matter comprises wood-based substrates. In some embodiments, the organic matter comprises non-wood-based substrates. In some embodiments, the organic matter does not include any wood-based substrates. In some embodiments, the organic matter comprises a combination of wood-based substrates and non-wood-based substrates. In some embodiments, the organic matter includes a grass. In some embodiments, the organic matter includes bamboo. In some embodiments, the organic matter includes wood shavings. In some embodiments, the mixture includes bamboo and wood shavings. In some embodiments, each bed 510 may be maintained without requiring bed tilling.

The earthworms can be a variety of earthworm species. The earthworms may be earthworms that thrive in organic-rich habitats, for example, containing manures, leaf litter, or rotting vegetation. In some embodiments, the earthworms comprise the species *Eisenia fetida* ("*E. fetida*"), also known as the red wiggler or the redworm. In some embodiments, the earthworms comprise the species *Eisenia andrei*. In some embodiments, the earthworms comprise the species Enchytraeidae. In some embodiments, the earthworms comprise a mixture of *Eisenia fetida* and *Eisenia andrei*. In some embodiments, the earthworms comprises a mixture of *Eisenia fetida* and Enchytraeidae. In some embodiments, the earthworms comprises a mixture of *Eisenia andrei* and Enchytraeidae. In some embodiments, the earthworms are added to the top of each bed 510. Each bed 510 may include other organisms that work synergistically with the earthworms, such microbes, mealworms, black soldier flies, fungi (e.g., mushrooms or mycelium), microfauna, and mesofauna.

At least a portion of the bed 510 forms a drilosphere. The drilosphere can be proximate area surrounding an earthworm and any subsequently earthworm-altered mineral and organic material that persists after an earthworm is no longer present is described as the drilosphere. In other words, the drilosphere may be defined as the entire soil volume that is under the influence of earthworms. This can include, for example, the burrow; earthworm castings; excreted mucus; coelomic fluid; and exuviated cellular and non-cellular material deposited on the internal lining of the burrow.

Additionally, in some embodiments, bed 510 may be aerated. In some embodiments, bed 510 is aerated by pipes that supply air to bed 510. In some embodiments, earthworm activity within bed 510 aerates the bed 510. In some embodiments, earthworm activity within bed 510 alone aerates bed 510 sufficiently to sustain the earthworm activity.

Wastewater may be applied to the top of each bed 510, for example by an irrigation system. The wastewater applied to each bed 510 may flow through the bed 510, and as the wastewater flows through bed 510, the bed 510 may treat the components of the wastewater to break down, remove, and/or sequester contaminants and/or toxic substances. In some embodiments, the earthworms may break down components in the wastewater to their constituent parts. For example, in some embodiments organic substances like PCBs can be broken down into hydrogen and carbon. In some embodiments, beds 510 can sequester contaminants and/or toxic substances, such as PFAS.

In some embodiments, each bed 510 can comprise other components, such as a fabric layer beneath the organic matter, and a foundation. In some embodiments, the foundation creates air space beneath the organic matter.

In some embodiments, the amount of wastewater is applied to the vermifiltration beds 510 based on the concentration of constituents in the wastewater. In some embodiments, the amount of wastewater applied to the vermifiltration beds 510 is based on the total number of gallons of wastewater to be treated. In some embodiments, the amount of wastewater applied to the vermifiltration beds 510 is based on environmental variables. In some embodiments, the environmental variables are the amount of precipitation in the environment or the ambient temperature.

Existing systems often use irrigation systems that are inefficient and result in poor bed coverage and inconsistent application of water (e.g., 75% coverage or less, overlapping coverage areas, etc.). Additionally existing irrigation systems often employ dome sprinklers that deliver wastewater in a circular pattern. Such systems cannot provide water to the entire upper surface of the bed, resulting in poor bed coverage. To maximize coverage of these types of dome irrigation systems, the sprayers often overlap significant coverage areas, resulting in uneven wet areas. Additionally, such systems typically provide wastewater by misting, which can be especially problematic in windy conditions. Misted wastewater typically will not be delivered to the bed surface in windy conditions. This increases the risk that contaminated water will end up in unintended or undesirable locations. The irrigation systems used with the vermifiltration systems 500 disclosed herein overcome these and other challenges as described below. Other existing systems often use an irrigation system that spans a distance and is located in the center of the surface being irrigated. This creates a challenge for vermifiltration systems because a person must walk on the bed to access and maintain the irrigation system heads. Such walking can disturb fungal networks created by the worms, which can reduce the effectiveness of the worms and the vermifiltration system.

In some embodiments, the wastewater is applied to beds 510 using an irrigation system, for example as shown in FIG. 3. The irrigation system provides an efficient system for applying the wastewater and/or pH-adjusted wastewater to vermifiltration beds 510. For example, the irrigation system may allow for efficient control of the rate of application, and it may ensure the wastewater and/or pH-adjusted wastewater is evenly spread across the top layer of vermifiltration beds 510. In some embodiments, the irrigation system is configured to apply wastewater to at least about 90% (e.g., at least about 92%, at least about 95%, at least about 96%, at least about 97%, at least about 98%, at least about 99%, or 100%) of the upper surface of the vermifiltration bed 510. In some embodiments, the irrigation system is configured to apply wastewater to at least about 96% of the upper surface of the vermifiltration bed 510. In some embodiments, the irrigation system can apply wastewater from about 96% to about 98% of the upper surface of the vermifiltration bed.

The irrigation system of system 500 may improve bed coverage and saturation compared to existing systems. For example, the saturation may be more even compared to existing systems. Additionally, the irrigation system may improve the consistency of permeation. In some embodiments, system 500 includes an irrigation system that applies irrigation by streaming the wastewater, which reduces the wastewater lost to drifting (such as when misting is used), reduces evaporation of the wastewater irrigated, and thus increases the amount of wastewater applied to beds 510. In some embodiments, system 500 includes an irrigation system that applied irrigation by streaming the wastewater. In some embodiments, irrigation system 500 includes a baffle to direct the water onto the beds 510.

FIG. 3 illustrates a diagram of an irrigation system of a vermifiltration system (e.g., system 500) according to some embodiments.

In some embodiments, the irrigation system of system 500 includes sprinklers 520 in beds 510. In some embodiments, sprinklers 520 are disposed only at the perimeter of bed 510. In some embodiments, sprinklers 520 are disposed along sides 514 and/or corners 516 of beds 510. In some embodiments, sprinklers 520 are disposed on regular intervals along side 514 of beds 510. In some embodiments, sprinklers 520 are disposed along only one side 514. In some embodiments, sprinklers 520 are disposed along both sides 514.

Sprinklers 520 can be spaced at intervals along the sides 514 of bed 510. The interval can be adjusted based on the specific size of bed 510. In some embodiments, sprinklers 520 are disposed along intervals such that sprinkler spray 550 provides at least about 90% (e.g., at least about 94%, at least about 96%, or at least about 98%) bed coverage to bed surface 540, as disclosed above. In some embodiments, sprinklers 520 are disposed at intervals of 10 feet along sides 514 of bed 510. In some embodiments, sprinklers 520 are disposed at all four corners 516 of bed 510. In some embodiments, sprinkler 520 on side wall 514 closest to each corner 516 is disposed a distance from the corner equal to the width of bed 510. For example, as shown in FIG. 3, bed 510 has a width of about 40 feet, a length of about 200 feet, and sprinklers 520 along side walls 514 are disposed 40 feet from corners 516.

FIG. 3 shows lines 550, which illustrate the spray boundaries of sprinklers 520. In some embodiments, each sprinkler along sides 514 sprays in a semicircle pattern with a radius of about 40 feet. In some embodiments, each sprinkler at corners 516 sprays in a quarter-circle pattern with a radius of 40 feet. When spaced as illustrated in FIG. 3 sprinklers 520 provide a relatively even application of wastewater.

The irrigation system of vermifiltration system 500 may operate on an irrigation schedule. In some embodiments, the irrigation schedule operates cyclically. In some embodiments, the schedule is automatic. In some embodiments, irrigation system cycles between an "on" mode and an "off" mode. In some embodiments, the irrigation system distributes wastewater in the "on" mode to the vermifiltration beds 510 for a first time period and stops distributing wastewater to beds 510 in the "off" mode for a second time period. In some embodiments, the first time period is from 1 minute to about 10 minutes. In some embodiments, the first time period is from 1 minute to about 10 minutes, from about 3 minutes to about 8 minutes, from about 4 minutes to about 7 minutes, from about 5 minutes to about 6 minutes, or within a range having any two of these values as endpoints. In some embodiments, the first time period is about 3 minutes to about 5 minutes. In some embodiments, the second time period is from about 10 minutes to about 60 minutes, from about 15 minutes to about 55 minutes, from about 20 minutes to about 55 minutes, from about 30 minutes to about 45 minutes, or within a range having any two of these values as endpoints. In some embodiments, the second time period is about 30 minutes to about 55 minutes. In some embodiments, the first time period is about 3 minutes and the second time period is about 30 minutes to about 55 minutes. In some embodiments, the first time period is about 5 minutes and the second time period is about 30 minutes to about 55 minutes. In some embodiments, system 500 includes a timer that automatically turns the sprinklers 520 on or off after a predetermined time.

In some embodiments, the irrigation schedule is varied based on several factors, including number of gallons to be treated and environmental factors, such as weather. In some embodiments, the irrigation schedule is varied based on the concentration of the contaminants in the wastewater. In some embodiments, the irrigation schedule is modified by a control unit. Further, the irrigation schedule may vary based on the composition of the wastewater. For example, if wastewater is more contaminated, polluted, or toxic, the irrigation system may operate on a schedule with a shorter "on" mode and/or a longer "off" mode. This increases the residence time of the wastewater in beds 510 and reduces the risk of killing earthworms. Likewise, if wastewater is less contaminated, polluted, or toxic, the irrigation system may operate on a schedule with a longer "on" mode and/or a shorter "off" mode.

In some embodiments, system 500 includes a wind speed meter (e.g., wind speed meter 518) for measuring the wind speeds at bed 510. In some embodiments, sprinklers 520 spray wastewater only when the wind is at or below a predetermined speed as determined by the wind speed meter 518. In some embodiments, system 100 includes a control system that automatically turns off the sprinklers 520 in response to the wind speed meter 518 detecting that the wind is greater than a predetermined value. In some embodiments, the control system automatically turns back on sprinklers 520 when the wind speed is at or below the predetermined speed as determined by wind speed meter 518.

In some embodiments, the wastewater has a residence time in beds 510 from about 1 hour to about 6 hours. In some embodiments, the residence time in beds 510 is from about 1 hour to about 6 hours, from about 2 hours to about 5 hours, from about 3 hours to about 6 hours, or within a range having any two of these values as endpoints. In some embodiments, the residence time is about 2 hours to about 5 hours. In some embodiments, the residence time is about 4 hours. In some embodiments, the residence time is about 1 hour, about 2 hours, about 3 hours, about 4 hours, about 5 hours, or about 6 hours.

In some embodiments, the vermifiltration beds 510 is a filter. In some embodiments, the residence time of the wastewater in beds 510 may vary based on the age of the filter and the depth of the filter. For example, residence time may increase as a filter ages.

In some embodiments, system 500 operates on a continuous basis. In some embodiments, system 500 treats from about 1000 gallons per day ("gpd") to about 100,000 gpd. In some embodiments, system 500 treats from about 1000 gpd to about 100,000 gpd, from about 5000 gpd to about 90,000 gpd, from about 10,000 gpd to about 75,000 gpd, from about 25,000 gpd to about 60,000 gpd, from about 35,000 gpd to about 45,000 gpd, or within a range having any two of these values as endpoints. In some embodiments, system 500 treats about 75,000 gpd.

The beds 510 may remove various contaminants, pollutants, and toxic substances. In some embodiments, beds 510 physically separate the contaminants, pollutants, and/or toxic substances. In some embodiments, beds 510 may break down contaminants, pollutants, and/or toxic substances such that they are no longer harmful. In some embodiments, beds 510 may sequester contaminants such that the effluent water includes less of the contaminants or none of the contaminants. For example, beds 510 may remove petroleum products; industrial chemicals; heavy metals (e.g., lead, mercury, cadmium, arsenic); pesticides (e.g., atrazine, chlorpyrifos); organic compounds (e.g., phenols, polycyclic aromatic hydrocarbons ("PAHs"), polychlorinated biphenyls ("PCBs")). In some embodiments, beds 510 may break down and/or sequester antidegradants (e.g., 6PPD quinone). In some embodiments, beds 510 may break down or sequester chemicals in de-icers (e.g., de-icers used at airports and on roadways). De-icers can include various components that can be sequestered and/or broken down by beds 510, such as glycol-based fluids (e.g., ethylene glycol and/or propylene glycol), alkylphenol ethoxylate (APE) surfactants, benzotriazole, and tolytriazole. In some embodiments, beds 510 may break down and/or sequester other contaminants, pollutants, and/or toxic substances, such as persistent organic pollutants ("POPs"). As used herein, persistent organic pollutants include toxic chemicals that adversely affect human health and the environment around the world. Examples of POPs include aldrin, chlordane, dichlorodiphenyl trichloroethane (DDT), perchlorate, dieldrin, endrin, heptachlor, hexachlorobenzene, mirex, toxaphene, polychlorinated biphenyls (PCBs), polychlorinated dibenzo-p-dioxins (dioxins), and polychlorinated dibenzofurans (furans).

Accordingly, the effluent from beds 510 may include less contaminants, pollutants, or toxic substances than the wastewater added to beds 510. In some embodiments, the effluent from beds 510 contains no contaminants, pollutants, and/or toxic substances. In some embodiments, beds 510 are capable of reducing the contaminants, pollutants and/or toxic substances by at least about 50% (e.g., at least about 75%, at least about 85%, at least about 90%, at least about 95%, at least about 97%, or at least about 99%). In some embodiments, beds 510 are capable of removing 100% of the contaminants, pollutants, and toxic substances.

In some embodiments, beds 510 are capable of removing at least about 75% of heavy metals (e.g., cadmium, arsenic, lead) in the wastewater.

In some embodiments, beds 510 are capable of removing at least about 85% of phenols in the wastewater. In some embodiments, beds 510 are capable of removing from about 90% to about 99% of phenols in the wastewater.

In some embodiments, beds 510 are capable of removing at least about 75% of PAHs in the wastewater. In some embodiments, beds 510 are capable of removing from about 75% to about 95% of PAHs in the wastewater.

In some embodiments, beds 510 are capable of removing at least about 65% of pharmaceuticals in the wastewater. In some embodiments, beds 510 are capable of removing from about 65% to about 95% of pharmaceuticals in the wastewater.

In some embodiments, beds 510 are capable of removing at least about 85% PCBs in the wastewater. In some embodiments, beds 510 are capable of removing from about 80% to about 99% of PCBs in the wastewater. In some embodiments, beds 510 are capable of removing about 99.9% of PCBs in the wastewater.

In some embodiments, beds 510 are capable of removing at least about 75% (e.g., at least 80%, at least 90%, or at least 95%) of 6PPD in the wastewater. In some embodiments, beds 510 are capable of removing from about 75% to about 95% of 6PPD in the wastewater. In some embodiments, beds 510 are capable of removing about 95% of 6PPD in the wastewater.

In some embodiments, beds 510 are capable of sequestering at least about 50% (e.g., at least about 75% or at least about 85%) of the de-icer chemicals found in wastewater.

In some embodiments, beds 510 are capable of removing at least about 50% (e.g., at least about 75% or at least about 85%) of colloidal solids in the wastewater.

In some embodiments, beds 510 are capable of removing at least about 50% (e.g., at least about 75% or at least about 85%) of dissolved solids in the wastewater.

In some embodiments, the removal of colloidal solids and/or dissolved solids reduces the turbidity of the wastewater and/or improves the color of the water. In some embodiments, beds 510 are capable of reducing turbidity to about 5 NTU or less (e.g., about 3 NTU or less or about 1 NTU or less). In some embodiments, beds 510 are capable of reducing turbidity to a range from about 1 NTU to about 5 NTU).

In some embodiments, beds 510 are capable of removing at least about 50% (e.g., at least about 75% or at least about 85%) of pathogens and/or biological contaminants in the wastewater.

In some embodiments, beds 510 are capable of removing at least about 50% (e.g., at least about 75% or at least about 85%) of POPs.

In some embodiments, system 500 has improved vector control compared to existing systems. For example, system 500 may comprise covers on beds 510 to prevent contamination. In some embodiments, system 500 may comprise sprinklers at randomized locations to prevent birds from landing on the beds.

In some embodiments, the treated wastewater is collected from the vermifiltration beds 510. In some embodiments, the treated wastewater is collected from the vermifiltration beds 500 in collection system 600. In some embodiments, the collection system 600 comprises collection tanks 610. In some embodiments, collection tanks 610 comprise one or more sumps.

In some embodiments, the treated wastewater is discharged from the system through discharge system 700. In some embodiments, the treated wastewater is recirculated through system 100. In some embodiments, the treated wastewater is recirculated through vermifiltration system 500. In some embodiments, the discharge system comprises discharge irrigation devices 710. In some embodiments, irrigation devices 710 recirculate treated wastewater through vermifiltration system. In some embodiments, irrigation devices 710 comprise sprinklers. In some embodiments, the discharge system comprises municipal discharge device 720. In some embodiments, municipal discharge device 720 transports treated wastewater from system 100.

In some embodiments, system 100 includes a control system, which can include one or more controllers. The control system can monitor various aspects of system 100. For example, the control system may be used to determine flow rates. In some embodiments, the control system determines flow rates based on various measured parameters, for example, level of contaminants, pollutants, and/or toxic substances in the wastewater. In some embodiments, the control system can adjust various parameters, such as flow rates, in real time based on the measured parameters.

Figure 2:
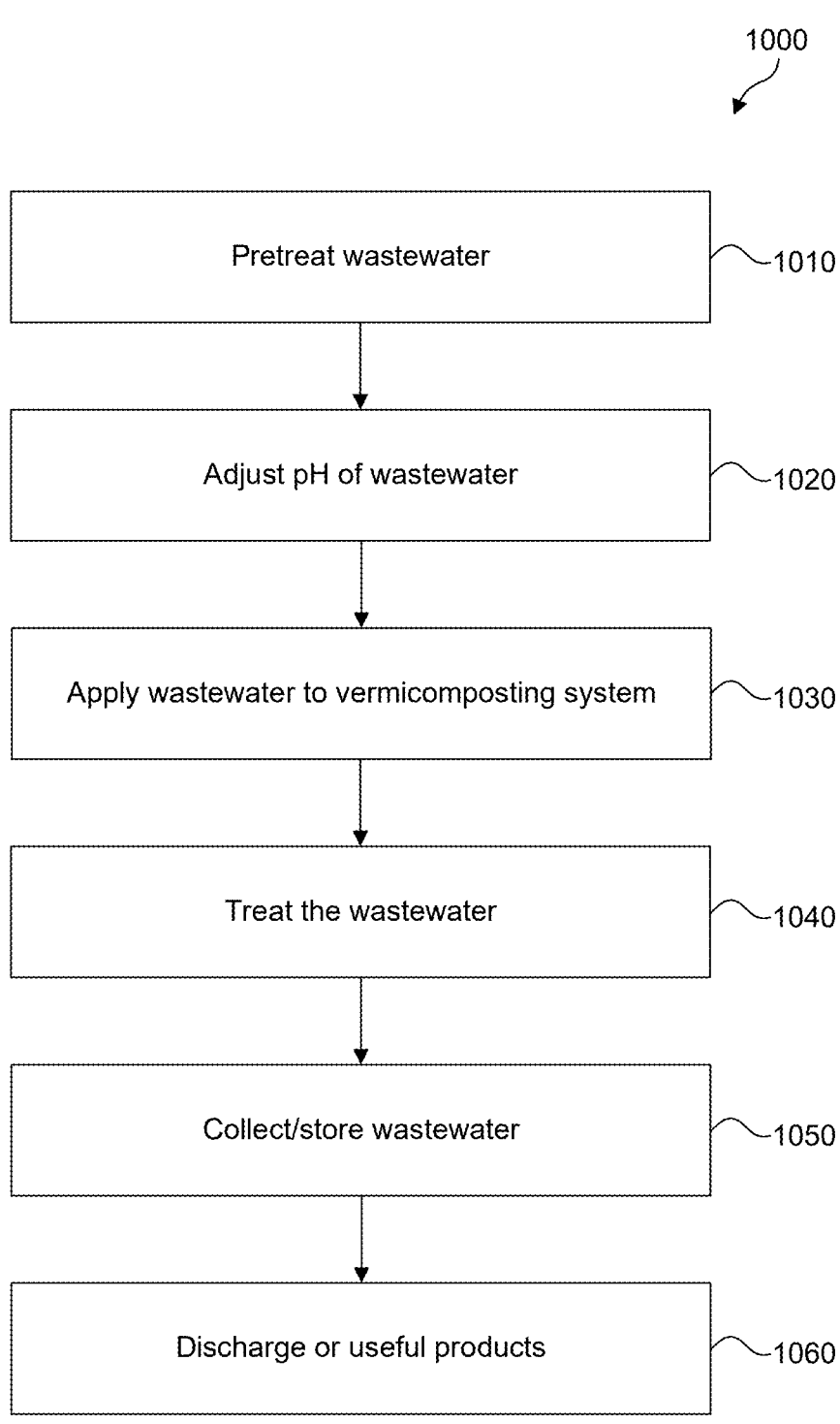
FIG. 2 shows a method of treating wastewater according to some embodiments.

FIG. 2 illustrates a method of vermifiltration (e.g. method 20) according to some embodiments. In some embodiments, method 1000 comprises steps 1010, 1020, and 1030.

In some embodiments, at step 1010, collected wastewater is pretreated, such as in pretreatment system 300 described above. In some embodiments, at step 1020, pretreated wastewater is transferred to equalization system 400, which is described above. In some embodiments, at step 1020, the pH of the pretreated wastewater is adjusted to a desired pH, for example in the ranges described above. In some embodiments, at step 1030, wastewater is transferred to vermifiltration system 500. In some embodiments, wastewater may be applied to vermifiltration beds 510, for example, by irrigation. In some embodiments, at step 1040, the wastewater is treated by vermifiltration in vermifiltration system 500 to produce treated wastewater. In some embodiments, the wastewater is transferred to vermifiltration system 500 after the pH of the wastewater has been adjusted in equalization system 400. In some embodiments, wastewater is transferred to equalization system 400 after passing through wastewater pretreatment system 300. In some embodiments, at step 1050, the treated wastewater is collected, such as in collection system 600. In some embodiments, at step 1060, the treated wastewater is discharged or used for a product. In some embodiments, the downstream product is a product that provides a beneficial use of the effluent. In some embodiments, at step 1060, the product is water for use in irrigation. In some embodiments, at step 1060, the product is discharged to surface water or groundwater. In some embodiments, at step 1060, the product is fertilizer.

As used herein, when the term "about" is used in describing a value or an end-point of a range, the disclosure should be understood to include the specific value or end-point referred to. As used herein, the term "about" may include ±10%.

It is to be appreciated that the Detailed Description section, and not any other section, is intended to be used to interpret the claims. Other sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Although the foregoing description discusses primarily vermifiltration of wastewater, it should be understood that the vermifiltration systems and methods described herein can be used to treat other types of contaminated water, such as storm water drainage and runoff.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The above examples are illustrative, but not limiting, of the present disclosure. Other suitable modifications and adaptations of the variety of conditions and parameters normally encountered in the field, and which would be apparent to those skilled in the art, are within the spirit and scope of the disclosure.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The breadth and scope of the present disclosure should not be limited by any of the above-described exemplary embodiments, but should be defined only in accordance with the claims and their equivalents.

What is claimed is:

1. A wastewater treatment system, comprising:
   a wastewater collection tank comprising wastewater disposed therein, the wastewater comprising at least one of municipal wastewater, industrial wastewater, winery wastewater, dairy wastewater, agricultural wastewater, roadway runoff, airport runoff, or storm water;
   a wastewater pretreatment system configured to reduce an average particle size of solids in the wastewater;
   an equalization system configured to adjust the pH of the wastewater; and
   a vermifiltration system configured to treat the wastewater to produce treated wastewater, the vermifiltration system comprising:
      a vermifiltration bed;
      an irrigation system, the irrigation system configured to distribute wastewater to the vermifiltration bed, wherein the irrigation system comprises sprinklers at the perimeter of the vermifiltration bed;
   a control system comprising a controller configured to adjust the irrigation system's schedule based on at least an amount of contaminants, pollutants, or toxic substances in the wastewater; and
   a discharge system configured to discharge at least a portion of the treated wastewater from the wastewater treatment system.

2. The system of claim 1, wherein the wastewater pretreatment system comprises a first tank, wherein the first tank is a settling tank configured to remove unsettled solids in the wastewater.

3. The system of claim 2, wherein the wastewater pretreatment system comprises a second tank, wherein the second tank is a maceration tank configured to dissolve solids in the wastewater.

4. The system of claim 1, wherein the equalization system comprises a buffering tank.

5. The system of claim 1, wherein the equalization system is configured to adjust the pH of the wastewater to a target pH, and wherein the target pH is in the range from about 5 to about 9.

6. The system of claim 5, wherein the target pH is in the range from about 6 to about 8.

7. The system of claim 1, wherein the vermifiltration bed further comprises earthworms.

8. The system of claim 1, wherein the vermifiltration bed comprises a non-wood substrate.

9. The system of claim 1, wherein the irrigation system comprises a plurality of sprinklers, wherein the plurality of sprinklers comprises a first sprinkler disposed at a first corner of the vermifiltration bed, and wherein the plurality of sprinklers comprises a second sprinkler disposed along a side wall of the vermifiltration bed.

10. The system of claim 9, wherein the irrigation system comprises a wind speed meter, and wherein system is configured to turn off the plurality of sprinklers in response to the wind speed meter detecting that the wind speed is greater than or equal to a predetermined speed.

11. The system of claim 1, wherein the irrigation system is configured to distribute wastewater to at least about 90% of a surface of the vermifiltration bed.

12. The system of claim 1, wherein the wastewater comprises a contaminant, wherein the contaminant comprises at least one of high biological oxygen demand, high total suspended solids, pH less than 5, pH greater than 9, N-(1,3-dimethylbutyl)-N'-phenyl-p-phenylenediamine ("6PPD"), polychlorinated biphenyls ("PCBs"), perchlorate, perfluoroalkyl, polyfluoroalkyl substances ("PFAS"), phenols, perfluorooctane sulfonate ("PFOS"), polycyclic aromatic hydrocarbons ("PAHs"), heavy metals, lead, mercury, cadmium, arsenic, pesticides, atrazine, chlorpyrifos, antidegradants, 6PPD-quinone, or de-icers, glycol-based fluids, ethylene glycol, propylene glycol, alkylphenol ethoxylate (APE) surfactants, benzotriazole, tolytriazole, a persistent organic pollutant, aldrin, chlordane, dichlorodiphenyl trichloroethane (DDT), dieldrin, endrin, heptachlor, hexachlorobenzene, mirex, toxaphene, polychlorinated biphenyls (PCBs), polychlorinated dibenzo-p-dioxins (dioxins), polychlorinated dibenzofurans (furans), or any combination thereof.

13. The system of claim 1, wherein the sprinklers are disposed only at the perimeter of the vermifiltration system.

14. The system of claim 1, wherein the irrigation system comprises:

a first sprinkler at a first corner of the vermifiltration bed that is configured to spray wastewater in a quarter-circle pattern; and a second sprinkler along a side of the vermifiltration bed that is configured to spray wastewater in a semicircle pattern, wherein the sprinklers are configured to spray water to achieve at least 90% coverage of the vermifiltration bed.

15. The system of claim 1, wherein the vermifiltration system has an open top and is open to the atmosphere.

16. The system of claim 1, wherein the discharge system is configured to discharge the portion of the treated wastewater to at least one of surface water, ground water, a municipal discharge device, or downstream irrigation.

17. The system of claim 1, wherein the discharge system is configured to recirculate a second portion of the treated wastewater to the irrigation system.

18. The system of claim 1, wherein the wastewater has a residence time in the vermifiltration system from about 1 hour to about 6 hours.

19. The system of claim 1, wherein the vermifiltration bed comprises filtration media, and wherein the filtration media comprises organic matter and earthworms.

20. The system of claim 19, wherein the vermifiltration bed comprises a wood-based substrate.

21. The system of claim 20, wherein the controller is configured to adjust the irrigation system's schedule automatically and in real time.

22. The system of claim 21, wherein the vermifiltration system comprises a foundation below the vermifiltration bed, wherein the foundation comprises an air space beneath the vermifiltration bed.

23. The system of claim 22, wherein the filtration media has a depth of about 3 feet to about 4 feet, and wherein the vermifiltration bed has a width of about 20 feet to about 50 feet and a length of about 200 feet to about 500 feet.

24. The system of claim 23, further comprising a treated wastewater collection system between the vermifiltration system and the discharge system, wherein the treated wastewater collection system comprises a treated wastewater collection tank configured to collect the treated wastewater from the vermifiltration system before the discharge system discharges the portion of the treated wastewater from the wastewater treatment system.

25. The system of claim 24, wherein the controller is configured to adjust the irrigation system's schedule based on ambient temperature and based on an amount of precipitation.

26. The system of claim 1, wherein the treated wastewater includes less contaminants, pollutants, or toxic substances than the wastewater.

27. The system of claim 1, wherein the system is configured to treat wastewater on a continuous basis.

28. The system of claim 1, wherein the vermifiltration bed is movable.

29. The system of claim 1, wherein the turbidity of the treated wastewater is lower than the turbidity of the wastewater.

30. The system of claim 1, wherein the wastewater collection tank is upstream of the wastewater pretreatment system, wherein the wastewater pretreatment system is upstream of the equalization system, and wherein the equalization system is upstream of the vermifiltration system.

\* \* \* \* \*